United States Patent Office 2,754,255
Patented July 10, 1956

2,754,255

DECOLORIZING TITANIUM TETRACHLORIDE

Edgel P. Stambaugh, Metuchen, N. J., assignor to National Lead Company, New York, N. Y., a corporation of New Jersey No Drawing. Application May 27, 1952,
Serial No. 290,317

4 Claims. (Cl. 202—57)

The present invention relates in general to the preparation of the tetrahalides of metals of the fourth group of elements and more especially to the purification of titanium tetrachloride and similar stable normally liquid distillable tetrahalides.

In general the tetrahalides of metals of the fourth group of elements are prepared by chlorinating a metal bearing material, and recovering the metal tetrachloride vapor in the form of a relatively impure liquid condensate. By way of example, liquid titanium tetrachloride is commonly prepared by treating a titaniferous material such as titaniferous iron ore, or ilmenite with chlorine gas, in a static bed or fluosolids operation, to form titanium tetrachloride vapor which is subsequently condensed to form a crude titanium tetrachloride condensate. Since there are a number of elements in the raw material, in addition to titanium, which react with chlorine to form volatile chlorides and which carry over with the titanium tetrachloride vapors, the titanium tetrachloride condensate, sometimes hereinafter referred to as crude titanium tetrachloride, is invariably impure. Moreover, it has been found that these volatile chlorides are not readily eliminated by distillation since the respective chlorides such as, for example, the chlorides of silicon, aluminum, niobium, tungsten and vanadium tend to distill over with the titanium tetrachloride values and to be found in the condensate. One such impurity which, because of the proximity of its boiling point to that of titanium tetrachloride, cannot be separated therefrom by fractional distillation is vanadium chloride. Vanadium chloride is present in substantially all crude titanium tetrachloride condensate and comprises a major portion of the impurities in the condensate and hence is chiefly responsible for the yellowish color of crude titanium tetrachloride. By way of example, a typical crude titanium tetrachloride may comprise from 0.25 to 0.35% vanadium based on the weight of the titanium tetrachloride the other impurities being present in relatively small amounts such as, for example, from 0.04 to 0.2% silica, from 0.02 to 0.025% alumina, from 0.01 to 0.02% niobium and from 0.05 to 0.09% tungsten.

While it has been proposed heretofore to purify crude titanium tetrachloride and other similar tetrahalides by treatment with such materials as hydrogen sulphide, silica gel, carbon, salts of the heavy metals, soya bean oil, art gum, etc. such methods have been characterized by polymerization and the formation of insoluble residues or residues which have been removable from the still bottoms only with the greatest difficulty. As a consequence the adaptation to commercial production of prior methods for purifying crude titanium tetrachloride have been attended by much difficulty and high cost.

An object of the present invention is, therefore, to provide a superior method for producing substantially pure liquid tetrahalides of the fourth group of elements.

A further object of the invention is to provide a superior method for purifying crude titanium tetrachloride which is convenient, economical and adaptable to commercial production.

A still further object of the invention is to provide a superior method for removing a major portion of the impurities from crude titanium tetrachloride in a manner such that no polymerization occurs and the residue formed may be readily removed from the still.

These and other objects will become more apparent from the following more complete description of the instant invention.

In its broadest aspects the present invention relates to a process for producing substantially pure liquid titanium tetrachloride by adding small amounts of an alkali metal hydroxide admixed with certain metals, to crude titanium tetrachloride and refluxing the admixture to form a substantially water-white titanium tetrachloride condensate.

The treatment of crude titanium tetrachloride, by which is meant a liquid titanium tetrachloride containing such impurities as vanadium, silica, alumina, niobium, tungsten and the like with an admixture of alkali metal hydroxide and metal, sometimes hereinafter referred to as the "purifying composition" may be carried out, according to the present invention, in any convenient manner which will insure the required intimacy of contact between the crude titanium tetrachloride and the purifying composition. Preferably the purification treatment is carried out in a purification unit, comprising, for example, a still having a fractionating column, a reflux return and a condenser, by heating an admixture of the crude titanium tetrachloride, alkali metal hydroxide and metal in the still to a temperature and for a period of time such that substantially all of the titanium tetrachloride and the purifying composition are circulated as vapor through the fractionating column and reflux return; and thereafter allowing the vapor to pass to the condenser in which the titanium tetrachloride will be condensed and collected as a water-white liquid. The heating of the constituents in the still and the recirculation of the vapors is sometimes hereinafter referred to as refluxing and may be facilitated by employing mechanical agitation or bubbling dry inert gases through the constituents.

It will be appreciated that the efficiency and efficacy of the refluxing operation hereinabove described may be enhanced by first eliminating any suspended colloidal matter and dissolved gases which may be in the crude titanium tetrachloride and which are susceptible to removal by fractional distillation.

The residue which forms in the bottom of the still comprises vanadium and small amounts of silica, alumina, tungsten, niobium and other impurities, the vanadium being in the form of $VCl_3$ and/or $VOCl_3$ which may be recovered from the residue by water leaching. It has been observed that the vanadium content of crude liquid titanium tetrachloride may be reduced by the process of this invention from about 0.35% by weight of titanium tetrachloride as found in crude titanium tetrachloride to about 0.0001% the purified liquid titanium tetrachloride being water-white.

The term "water-white" is used herein to denote a substantially pure titanium tetrachloride condensate. In particular, a titanium tetrachloride condensate purified by the process of this invention and defined as water-white is one having a major portion of its impurities removed, that is to say the maximum vanadium content is in the range from about 0.0001% to 0.0003% by weight of the titanium tetrachloride the remaining impurities in the titanium tetrachloride condensate being present in such small quantities as to be innocuous.

The time and temperature of the treatment is dependent to some extent upon the amount of impurities in the crude titanium tetrachloride and the amount of alkali metal hydroxide and metal used to remove the impurities from the titanium tetrachloride. Moreover, the amount of alkali metal hydroxide and metal used is, in turn, dependent upon the amount of impurities and in particular the amount of vanadium present in the crude titanium tetrachloride. The length of time necessary for effective treatment of the crude liquid titanium tetrachloride varies inversely with the amount of alkali metal hydroxide and metal added to the crude titanium tetrachloride. For economical reasons a minimum amount of the purifying composition is preferred for effecting substantially complete purification of the crude titanium tetrachloride and where the minimum amount of the purifying composition added is, for example, substantially 0.15 to 0.2% based on the weight of the crude titanium tetrachloride the time required for refluxing a mixture of crude titanium tetrachloride and the purifying composition is about 2 hours. However, it has been observed that when the amount of purifying composition is substantially 0.25 to 0.3% then the reflux time is about 1 hour. In short, as the amount of purifying composition added to the crude titanium tetrachloride is increased the time required for refluxing the mixture of crude titanium tetrachloride and the purifying composition is decreased.

In carrying out the treatment of the crude titanium tetrachloride with an alkali metal hydroxide and metal the alkali metal hydroxide and metal are preferably used in powdered or granular form, sometimes hereinafter referred to as comminuted, and are added to crude titanium tetrachloride at substantially room temperature whereupon the constituents are heated to a temperature of from about 134° C. to 138° C., and agitated, if necessary, for a period of time generally in the neighborhood of about 2 hours after which the titanium tetrachloride vapors are condensed to produce a substantially water-white condensate. A treatment time of about 2 hours is usually sufficient with the amount of purifying constituents equal to about 10 to about 30 parts of alkali metal hydroxide, about 1.5 to about 20 parts of powdered metal per 1000 parts of titanium tetrachloride by weight.

The following example is illustrative:

Example

To 3520 parts of crude titanium tetrachloride at substantially room temperature were added a powdered alkali metal hydroxide and a powdered metal, the amounts of alkali metal hydroxide and powdered metal used being shown in the table. The constituents were refluxed at a temperature of from about 134–138° C. for a period of from one to two hours and then distilled at normal pressure out of contact with the outside atmosphere. The distillate was a substantially water-white titanium tetrachloride and the residue formed in the bottom of the still comprised water soluble vanadium compounds, rutile, anatase, and minute quantities of other impurities such as those named above.

The following table contains the results of experiments run using NaOH and KOH as the alkali metal hydroxide admixed with powdered metals such as, for example, Na, Mg, Ti and Al.

By the process of this invention crude titanium tetrachloride containing impurities the major portion of which is vanadium may be purified by refluxing the titanium tetrachloride in the presence of a relatively small quantity, based on the amount of titanium tetrachloride, of an admixture of an alkali metal hydroxide and a metal, such as powdered magnesium, aluminum, titanium and sodium. The condensed vapors form a substantially pure water-white titanium tetrachloride condensate. The process is carried out in an economical and commercially practical manner and while it has been described with particular reference to the treatment of titanium tetrachloride it is not to be so limited since other tetrahalides of the metals of the fourth group of element may be purified in a similar manner.

While this invention has been described and illustrated by the example shown it is not intended that it be limited thereto and other modifications and variations may be employed within the scope of the following claims.

I claim:

1. A process for treating crude titanium tetrachloride to remove a major portion of the impurities therefrom which comprises admixing the crude titanium tetrachloride with a solid alkali metal hydroxide selected from the group consisting of sodium hydroxide and potassium hydroxide, and a metal selected from the group consisting of sodium, magnesium, titanium and aluminum; and refluxing said admixture in the absence of water at a temperature and for a period of time sufficient to produce a water-white titanium tetrachloride condensate.

2. A process for purifying crude titanium tetrachloride by removing a major portion of the vanadium therefrom which comprises admixing the crude titanium tetrachloride with small amounts of a comminuted alkali metal hydroxide selected from the group consisting of sodium hydroxide and potassium hydroxide, and a finely divided metal selected from the group consisting of sodium, magnesium, titanium and aluminum, and for each 1000 parts of titanium tetrachloride to be treated the alkali metal hydroxide being present in amount from about 10 parts to about 30 parts by weight and the finely divided metal being present in amount from about 1.5 parts to 20 parts by weight; refluxing the admixture in the absence of water at a temperature and for a period of time sufficient to separate a major portion of the vanadium from the titanium tetrachloride; and distilling the refluxed titanium tetrachloride.

3. A process for purifying crude titanium tetrachloride by removing a major portion of the vanadium therefrom which comprises admixing the crude titanium tetrachloride with small amounts of a finely divided alkali metal hydroxide selected from the group consisting of sodium hydroxide and potassium hydroxide and a finely divided metal selected from the group consisting of sodium, magnesium, titanium and aluminum, and for each 1000 parts of titanium tetrachloride to be treated the finely divided alkali metal hydroxide being present in amount from about 10 parts to about 30 parts by weight and the finely divided metal being present in amount from about 1.5 parts to 20 parts by weight; refluxing the admixture in the absence of

Table

| Exp. No. | Alkali Metal Hydroxide Parts [1] | Metal Parts [1] | Refluxing time at 136° C., Hours | Color of Distillate | Vanadium Content in Distillate, percent |
|---|---|---|---|---|---|
| 1 | 1.0% NaOH (powdered) | 0.2% Na (wire) | 2.5 | water-white | 0.0001 |
| 2 | 2.0% NaOH (powdered) | 2.0% Mg (powdered) | 2.0 | ----do---- | 0.0001 |
| 3 | 2.5% NaOH (powdered) | 2.0% Ti (granular) | 3.0 | ----do---- | 0.0002 |
| 4 | 3.0% NaOH (powdered) | 2.0% Al (powdered) | 2.0 | ----do---- | 0.0003 |
| 5 | 1.0% KOH | 0.2% Na (wire) | 2.0 | ----do---- | 0.0003 |
| 6 | 2.0% KOH | 2.0% Mg (powdered) | 2.0 | ----do---- | 0.0003 |

[1] Expressed in percentage based on weight of crude TiCl$_4$.

water at a temperature of from about 134° C. to about 138° C. and for a period of time from about 1 to about 3 hours to separate a major portion of the vanadium from the titanium tetrachloride; and distilling the refluxed titanium tetrachloride.

4. A process according to claim 2 in which the alkali metal hydroxide is powdered sodium hydroxide and in which the finely divided metal is titanium.

References Cited in the file of this patent

UNITED STATES PATENTS

| | | |
|---|---|---|
| 2,178,685 | Gage | Nov. 7, 1939 |
| 2,230,538 | Jenness et al. | Feb. 4, 1941 |
| 2,344,319 | Meister | Mar. 14, 1944 |
| 2,396,458 | Cole et al. | Mar. 12, 1946 |
| 2,416,191 | Meister | Feb. 18, 1947 |
| 2,457,917 | Nicholson | Jan. 4, 1949 |
| 2,560,423 | Espenschied | July 10, 1951 |
| 2,560,424 | Espenschied | July 10, 1951 |
| 2,598,897 | Espenschied | June 3, 1952 |

OTHER REFERENCES

Chemical Abstracts, volume 16, 1922.

Stoddard et al.: Abstract of application, Serial No. 706,498, published February 21, 1950. 631 O. G. 883.